United States Patent [19]
Lissack

[11] Patent Number: 5,260,633
[45] Date of Patent: Nov. 9, 1993

[54] SHAFT ROTATIONAL STATUS INDICATOR

[75] Inventor: Selwyn Lissack, 12002 Woodlawn Ave., Santa Ana, Calif. 92705

[73] Assignee: Selwyn Lissack, Santa Ana, Calif.

[21] Appl. No.: 947,849

[22] Filed: Sep. 21, 1992

[51] Int. Cl.[5] ............................................. G05B 1/06
[52] U.S. Cl. .................................... 318/640; 318/135
[58] Field of Search ................................. 318/135, 640

[56] References Cited

U.S. PATENT DOCUMENTS

| | | | |
|---|---|---|---|
| 4,596,919 | 6/1986 | Kremers et al. | 318/577 X |
| 4,652,738 | 3/1987 | Nishihara et al. | 318/577 X |
| 4,655,587 | 4/1987 | Wijntjes et al. | 356/346 X |
| 4,703,240 | 10/1987 | Yoshimoto et al. | 318/587 X |
| 5,049,798 | 9/1991 | Jackson | 318/640 |
| 5,105,139 | 4/1992 | Lissack | 318/626 |
| 5,166,749 | 11/1992 | Curbelo et al. | 356/346 X |

*Primary Examiner*—William M. Shoop, Jr.
*Assistant Examiner*—Karen Masih

[57] ABSTRACT

Apparatus for using an integrated diode array, also called a position sensing detector, which indicates the position of a spot of electromagnetic radiation along a sensitive strip, to measure angular rotation of a stationary shaft from a zero point. A beam of infrared or laser radiation is reflected from a mirror set at an angle other than 90 degrees to the shaft axis, located on a free end of the shaft. The reflected beam falls on the integrated diode array, its position being proportional to the tangent of the angle from the zero point (preferably the center of the sensitive area). The sum of analog voltage signals from both ends of the sensitive area is held constant by second electronic means through feedback monitoring of the radiation source power (beam intensity). In a shaft-angle controlling embodiment, the difference of the two analog voltage signal outputs is adjusted to be equal to a predetermined voltage corresponding to the desired angle using a first electronic means feeding back to whatever rotates the shaft.

4 Claims, 1 Drawing Sheet

SHAFT ROTATIONAL STATUS INDICATOR

FIELD OF THE INVENTION

In the broad field of acquiring or displaying information, the need for measuring the rotational position of a shaft at rest sometimes occurs. Rapid sensing of that rotational position and conversion of the findings into an electric analog signal is important in information-gathering applications, and adjustment of shaft rotational position to a targeted, desired position is important in control-seeking applications. The invention is in the field of accomplishing these important functions with speed and precision.

DESCRIPTION OF PRIOR ART

The principal development in this field has been in the area of turning a shaft to a pre-selected angle, for steering missiles, identifying where on a circuit board to hand-load electronic components, positioning marks on products such as integrated-circuit chips, applying heat to solder tiny parts, etc. The former art had the shaft vary capacitance via an attached capacitor plate. That drifted badly, and was recently replaced by the optical feedback obtained by reflecting light from a mirror mounted on the shaft periphery, as taught in U.S. Pat. No. 5105139, a system less subject to thermal drift. Fairly large corrections were still required within the feedback electronics, however.

One object the present invention achieves is to reduce the magnitude of feedback corrections so as to reduce possible errors in them, drift errors and errors due to nonlinearity of components.

Another object is to replace discrete photoconductive sensors, the devices which in prior art detect the reflected optical beam, with the more accurate integrated diode array sensor.

Another object is to so arrange the optical circuit as to be free of almost all effects due to angles of incidence between the light beam and the component on which it impinges for either reflection or sensing. This near-freedom not only means relatively small corrections (and errors in corrections) but also confers the advantage that the optical system characteristics (such as low angle of incidence) cease to limit the range of shaft rotational angles the system will tolerate.

SUMMARY OF THE INVENTION

NOTE: As used herein, the phrase "a substantially parallel beam of electromagnetic radiation" refers not only to the output beam of a laser, but also to the small-angle cone of radiation at or near the image position in a focused beam when the object position (the radiation source) is only slightly beyond the focal length of a focusing lens (when the magnification is large).

A substantially parallel beam of electromagnetic radiation from an LED, or collimated coherent electromagnetic radiation from a laser, is set up to proceed along the axis of rotation of a shaft whose rotary position is to be closely controlled. The beam is directed toward a free end of the shaft, the free end being both converted into a mirror or bearing a mirror and finished at an angle to the shaft axis other than 90 degrees, preferably between 40 and 85 degrees and in the preferred embodiment 45 degrees. The sensitive portion of an integrated diode array is so positioned to receive the reflected electromagnetic radiation (in the preferred embodiment positioned in the plane normal to the end of the shaft axis), with the length of the sensitive portion lying at 90 degrees to the shaft, separated inches from the shaft, and tangential to a circle centered on the shaft axis. The reflected spot thus moves along the length of the sensitive portion of the integrated diode array and generates a signal related to the rotational position of the shaft. The diameter of the beam is less than the width of the sensitive portion, so the position of the center of the circular or elliptical reflected spot, whose intensity is modulated by a first electronic means to compensate for ellipticity, is an accurate measure of the rotational position of the shaft, and any error with respect to a preselected position may be fed back using a second electronic means to the shaft drive and corrected. This application of the invention applies to devices which require the shaft to assume a certain rotational position or a sequence of desired positions (shaft angles with respect to whatever zero position was selected; i.e., the shortest line from the shaft axis to any point on the sensitive area of the integrated diode array).

When an application of the invention requires measurement of the rotational position to which the shaft is driven by external means, the comparison and feedback elements are omitted from the second electronic means and the position data, amplified or not, is supplied to external measuring instruments. The first electronic means is used as noted above.

DETAILED DESCRIPTION

Figure 1:
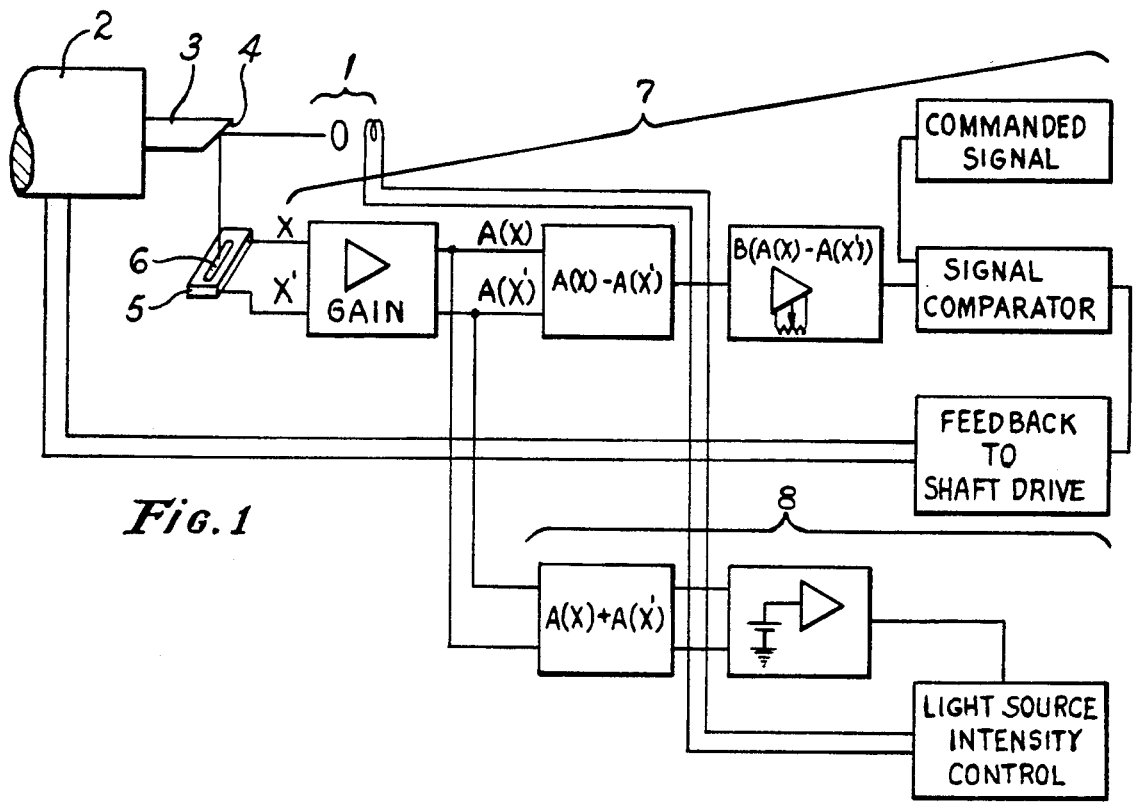
FIG. 1 shows a perspective view of the invention, together with a schematic representation of the electronic means to be used when the application is positioning.
Figure 2:
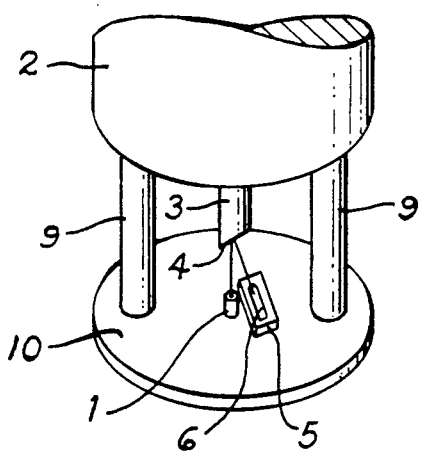
FIG. 2 is a perspective view of the invention itself, differing from FIG. 1 in that typical mounting structure is shown and an alternate angle on the shaft end is shown.

FIG. 1 shows the invention as it would be used in the most physically complex application—that of establishing a desired shaft angle or rotational position of the shaft at rest. The preferred embodiment of using a mirror (Item 4) angle of 45 degrees is illustrated. Item 1 is the hardware which produces a substantially parallel beam of electromagnetic radiation, shown as a filament close to the focal point of a lens. In FIG. 2, Item 1 remains the hardware but is shown as a laser which produces a beam not only collimated but also coherent. Either will produce a substantially parallel beam of electromagnetic radiation. Item 1 must have a power supply (not shown) capable of being modulated so as to vary the intensity of the substantially parallel beam of electromagnetic radiation under the control of a first electronic means (Item 8). Since the integrated diode array outputs are somewhat affected by the intensity of light in the reflected beam, and since an off-normal circular spot becomes elliptical and hence of lower local intensity, the correction made by Item 8 is necessary for the apparatus to be as error-free as possible. By keeping the sum of the two outputs from Item 5, X and $X^1$ (the distances of the spot from fixed end points), constant, Item 8 converts their difference into a highly accurate measurement of the motion of the reflected light spot from an initial position. The initial position may be set by the user at any point in the sector of interest, by means external to the invention.

Item 2 is the shaft drive, a special-purpose electric motor in the preferred embodiment. Item 8 is the shaft, and Item 4 the reflective surface or mirror fashioned on or attached to the free end of shaft Item 3. Item 4 intersects the shaft axis at an angle other than 90 degrees, 45 degrees being the preferred embodiment. FIG. 1 shows Item 4's angle to be 45 degrees; FIG. 2 shows it roughly 70 degrees.

Item 9 standoffs and Item 10 hardware mounting plate shown in FIG. 2 simply depict a typical mounting arrangement. Item 7 is a second electronic means used for the primary application of this apparatus, to establish the rotary position of shaft 3 at a desired shaft angle. As is shown in FIG. 1, Item 7 performs in sequence amplification of the integrated diode array Item 5's two output signals, subtraction, amplification of the difference, comparison with a signal corresponding to the desired shaft rotary position, feedback of any error to shaft drive 2 to correct the actual shaft rotary position to that desired. (The discussion assumes the initial position is in the center of the integrated diode array Item 5.)

A brief description of an integrated diode array commercially available currently is a small packaged integrated circuit having a sensitive area about ¾ inch long by 1/16 wide on one face, capable of distinguishing between 40,000 positions along its length when a position is illuminated by a beam of microscopic cross section and used with beams up to 1/16 inch cross section.

The geometric relations of shaft axis, integrated diode array sensitive area placement and its effect on the two analog voltage signal outputs (one output indicating distance of the illuminated spot from one end of the sensitive area and the other voltage output likewise proportional to the distance of the illuminated spot from the other end of the sensitive area) follows straightforward solid geometry. Were the integrated diode array sensitive surface curved to be a constant distance from the shaft axis, whether the illuminated spot was at the center or at an end, the outputs would be proportional to angle directly. However, since the sensitive surface is flat in all commercially available integrated diode arrays, the closest approach of it to the shaft axis represents a point of tangency to the cone traced by the reflected beam if the mirror angle is greater than 45 degrees. The sensitive area is normally (in the preferred embodiment) centered on this point when the shaft is at "zero" rotational position, hence spot positions not at the center of the sensitive area correspond not to angular displacement from "zero" but to the tangent of angular displacement. Obviously the "zero" rotational position need not be at the center of the sensitive area; if the application calls for control only clockwise from "zero" greater displacement angles can be measured or established when the "zero" point, the point of tangency, is preset at one end of the sensitive area. Such a change, obvious to one skilled in the art, is deemed within the scope of this invention.

Figure 3:
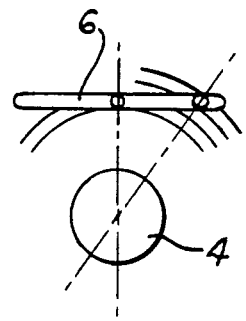
FIG. 3 is a sketch to be used in discussing choice of shaft-end angle, taken basically from the light source position, except that the integrated diode array is rotated 90° into the plane of the paper and construction lines to clarify the discussion are shown.

FIG. 3 is a mathematical construction to aid in understanding off-square conditions when the light from mirror 4 strikes flat sensitive area 6. The lines across Item 4 are both lines showing the locus of maximum slope of Item 4; the vertical one corresponding to the situation in FIG. 2 when the reflected beam is at an arbitrary angle to the incident beam (twice the angle between mirror 4 and the axis of shaft 3). Integrated diode array 5 is mounted tilted by the same arbitrary angle with respect to the surface of hardware mounting plate 10, so the substantially parallel electromagnetic beam—taken to be cylindrical—illuminates a circular spot on sensitive area 6. If sensitive area 6 were a flat plate, the lower set of the two curved lines in FIG. 3 would trace a cone with its apex at the point where shaft 3 axis intersects mirror 4. Since sensitive area 6 is not curved but flat and lies tangent to the swept-out cone, its ends are farther from the apex, farther down the cone, and have therefore a greater radius as shown in FIG. 3 by the pair of shorter curved lines. The spot illuminated is no longer a circle but an ellipse; a geometric construction too small to analyze from FIG. 3 but lying between the pair of short curved lines. The size of the ellipse may be calculated from an angle of incidence calculated by solid geometry, adding two angles at right angles to each other to obtain the angle across the diagonal. One of the angles is displacement of the spot along the length of sensitive area 6, the other is represented by the distance between the pairs of lines. The drawing does not show these angles at a right angle to each other because, to be geometrically correct it would show the sensitive area 6 as a line (and instead of pairs of sweep lines; the sweep lines would be singular). In any case this calculation need only be done to design the mounting properly; in operation regardless of spot size as long as the output signal total is rendered equal to itself (held constant) regardless of spot position, by altering the electromagnetic beam's intensity the apparatus will give spot distance along the sensitive area accurately. It is true that a spot width less than the width of sensitive area 6 will allow a small amount of transverse motion to occur due to the second angle discussed above. This transverse motion calculates to be 0.019 inches per inch between Items 4 and 6 when the angle of Item 4 is 70 degrees. There is also an effect on the angle of incidence (making the ellipse axis tilt) which amounts to less than 0.1 degree (out of 7 degrees or so). These factors will not affect the performance of individual diodes in the array, nor the performance of the apparatus as described and claimed. Simple reasoning from FIG. 3's teaching reveals that a wide sector of interest, which requires close spacing between Items 4 and 6, elongates the ellipse even for a 45 degree tile of mirror 4, but this is fully compensated for by Item 8.

For completeness, it should be mentioned that the two outputs of integrated diode array 5 in FIG. 1 are X and $X^1$ and are referred to a ground lead brought out of Item 5 which is not shown in the figure. Position detector means (not shown) would merely sense, amplify, and display either one of the two outputs, and eliminate the commanded signal, its comparator, and the feedback from second electronic means 7 shown in FIG. 1, retaining first electronic means 8.

The integrated diode array Item 5 is known commercially as a position sensing detector. The sensitive area consists of a stack of photoconductive diodes, a tiny resistor being associated with each diode and the diodes being long and narrow. The array is thus like a ladder containing only rungs, no foot spaces. When a diode is adequately illuminated at any point along its length, it conducts current through its resistor (which, being on the upright element of the ladder, is in series with all the resistors associated with non-conducting diodes to the foot and top of the "upright." Current flowing to ground through those diodes which are conducting comes partially from the "X" end of the array and partially from the "X¹" end, through as many tiny resistors as there are diodes between the illuminated spot and the end of the array, thus providing a signal affected by position.

When the illuminated spot is elliptical due to geometry rather than circular, a broader set of diodes become photoconductive. For reasons unclear to the inventor, experience shows that reducing the intensity of the substantially parallel beam will decrease the total current conducted by the set of photoconductive diodes to that which would be conducted were the beam perpendicular and the spot circular about the same center as the ellipse. This phenomenon may be due to differing intensities within the cross section of the beam or to some other cause, but it is reliable and enables second electronic means Item 8 to render the total signal X +X¹ constant without exceeding current carrying limitations on integrated diode array Item 5.

It is noted that the description given earlier and that given above pertains to currently available commercial products, the preferred embodiment. In the claims the term is intended to include arrays of photoconductive diodes operating on the same principles, for example non-flat arrays or arrays with wider sensitive areas, since in terms of the present invention, as long as modulation of the beam intensity helps positioning accuracy detailed construction of the array is not germane to this invention.

The invention having been described in its preferred embodiment, it is clear that modifications are within the capacity of those skilled in the art without exercise of the inventive faculty.

Accordingly, the scope of this invention shall be defined in the scope of the following claims:

1. Apparatus for adapting an integrated diode array to produce an analog voltage signal proportional to the tangent of the rotational position of a shaft at rest, with respect to the shortest line connecting the shaft axis to the sensitive area of the diode array, comprising:
   a substantially parallel beam of electromagnetic radiation directed axially toward a free end of the shaft, and
   a power source for said substantially parallel beam capable of varying the intensity of radiation within the beam, and
   a reflective surface on the free end of the shaft at an angle of 40-85 degrees to the shaft axis, and
   an integrated diode array the flat sensitive area of which lies in the path of the reflection of said substantially parallel beam from said mirror and extends transversely to the shaft axis and tangent to the cone swept out be said substantially parallel beam as the shaft rotates, said integrated diode array having two outputs consisting of analog voltage signals, proportional to the distance from the two ends of said integrated diode array sensitive area to the reflection of said substantially parallel beam and
   first electronic means adding the two outputs from said integrated diode array, each output being an analog voltage of different polarity proportional to the distance form the reflected substantially parallel beam to an end of the sensitive area, and keeping the total constant by controlling said power source,
   whereby each of the outputs will constitute an analog voltage signal proportional to the tangent of the rotational angle of the shaft with respect to a line from the shaft axis to the center of the sensitive area of said integrated diode array when the integrated diode array sensitive area is flat.

2. Apparatus as in claim 1 wherein the mirror angle is 45 degrees and the cone swept out by said substantially parallel beam as the shaft rotates is a plane.

3. Apparatus for bringing the rotary position of a rotationally driven shaft to a desired shaft angle with respect to the shortest line between the shaft axis and the flat sensitive area of an integrated diode array, comprising:
   a substantially parallel beam of electromagnetic radiation created by a power supply and directed toward a free end of the shaft and centered on its axis, and
   a mirror located on the free end of the shaft at an angle between 40 degrees and 85 degrees to the shaft axis, and
   an integrated diode array the flat sensitive area of which lies in the path of the reflection of said substantially parallel beam from said mirror and extends transversely to the shaft axis and tangent to the cone swept out by said substantially parallel beam as the shaft rotates, said integrated diode array having two outputs consisting of analog voltage signals, proportional to the distance from the two ends of said integrated diode array sensitive area to the reflection of said substantially parallel beam and
   first electronic means to modulate the power supply to said substantially parallel beam such that the sum of the two integrated diode array outputs remains constant, and
   second electronic means to affect the shaft drive in such a rotary direction and amount as to bring the difference between the two integrated diode array outputs to that corresponding to the desired shaft angle.

4. Apparatus as in claim 3 wherein the mirror angle is 45 degrees and the cone swept out by said substantially parallel beam as the shaft rotates is a plane.

* * * * *